United States Patent [19]
Kitani

[11] Patent Number: 4,729,651
[45] Date of Patent: Mar. 8, 1988

[54] PROGRESSIVE POWER OPHTHALMIC LENS

[75] Inventor: Akira Kitani, Fussa, Japan

[73] Assignee: Hoya Lens Corporation, Tokyo, Japan

[21] Appl. No.: 354,051

[22] Filed: Mar. 2, 1982

[30] Foreign Application Priority Data

Jun. 19, 1981 [JP] Japan .................................. 56-95072

[51] Int. Cl.⁴ ............................................... G02C 7/06
[52] U.S. Cl. ..................................... 351/169; 351/177
[58] Field of Search ............................... 351/168–172, 351/177

[56] References Cited
U.S. PATENT DOCUMENTS 4,606,622 8/1986 Fuëter et al. ......................... 351/169

FOREIGN PATENT DOCUMENTS 39497 11/1981 European Pat. Off. ............ 351/169
2814916 10/1979 Fed. Rep. of Germany ...... 351/169

Primary Examiner—John K. Corbin
Assistant Examiner—Scott J. Sugarman
Attorney, Agent, or Firm—Bert J. Lewen; Henry Sternberg

[57] ABSTRACT

An improved ophthalmic lens for presbyopia is disclosed in which the refractive power is progressively changed to provide a natural visual target arrangement. In the opthalmic lens, rotation of the head of a wearer for binocular lateral vision is taken into account to permit comfortable binocular lateral vision closer to vision with the naked eyes.

3 Claims, 7 Drawing Figures

PROGRESSIVE POWER OPHTHALMIC LENS

This invention relates to opthalimic lenses and more particularly to improvements in an ophthalmic lens for presbyopia having progressively changing refractive power.

Presbyopia designates such a state of the eyes of a man that the eye lens in the eyeball is no more capable of adjusting itself to focusing necessary for near vision due to the loss of its original elasticity. Therefore, he will be able to easily see an object located at a short distance again when he wears a convex lens which makes up the shortage of accommodation.

It is customary that near vision is generally done through the lower areas of lenses mounted in a spectacle frame. Therefore, a single pair of spectacles can make necessary visual power compensations for both the near vision and the distant vision when the lower areas of the conventional lenses for distant vision in the spectacle frame are replaced by the convex lenses described above.

A bifocal lens is a simplest form of such a multifocal ophthalmic lens. The convex lens portion for near vision in the multifocal ophthalmic lens is called the segment, and there are a variety of kinds in the shape, location, material, etc. of the segment.

However, the lenses of this kind have had such a common defect that, during transition of vision from distant vision to near vision, there occurs an abrupt change in the magnification resulting in a sense of physical confusion. A so-called progressive power opthalmic lens has been proposed in an effort to alleviate the abrupt change in the magnification of the image. According to the progressive power ophthalmic lens, the surface design is such that the refractive power is progressively changed to eliminate the sense of physical confusion, and the field of intermediate vision can also be provided in the region of the boundary between the distant vision and the near vision.

This progressive power opthalmic lens is also aesthetically advantageous over the bifocal lens in that the boundary line separating the lens portion for near vision is not conspicuously sensed in the external appearance compared with the bifocal lens, and, thus, it is not perceived as that specifically prepared for presbyopia.

The progressive power ophthalmic lens is featured by the presence of a succession of "umbilical points" forming a so-called "umbilical meridian curve" extending substantially from an upper central portion to a lower central portion of the lens surface. This "umbilical meridian curve" is such that astigmatism therealong is almost equal to zero, and the refractive power changes progressively according to a predetermined rule. The term "umbilical point" is used herein to designate the point at which two major radii of curvature are equal to each other.

A lens surface having such an "umbilical meridian curve" can be theoretically relatively easily designed as will be described later.

However, in the prior art progressive power ophthalmic lens, the rotation of the head of a wearer for lateral vision described later is not utterly taken into account. Generally, it is customary that not only the eyeball but also the head of a wearer is turned toward a visual target located on a lateral side when the wearer sees such a visual target. In other words, the rotation of the head compensates for the rotation of the eyeball. In the case of the prior art progressive power ophthalmic lens, the arrangement of the visual target, which was assumed by a designer when he designs a lens, has been unnatural because of the fact that the rotation of the head is not utterly taken into account.

It is therefore a primary object of the present invention to provide an ophthalmic lens in which the unnatural arrangement of the visual target in the prior art lens is replaced by a more natural visual target arrangement, and the rotation of the head of the wearer for binocular lateral vision is taken into account, thereby permitting comfortable bimocular lateral vision quite close to the vision with the naked eyes.

In accordance with the present invention, there is provided an ophthalmic lens having two refractive surfaces, one of the refractive surfaces including an imaginary first meridian curve called, for the purpose of explanation, an umbilical meridian curve extending substantially in the vertical direction along the refractive surface when the refractive surface is viewed from a direction substantially orthogonal with respect thereto in the condition in which the lens stands in the same vertical direction as that mounted on a wearer, the distribution of the radius of curvature of the umbilical meridian curve including a zone in which the radius of curvature decreases gradually from an upper portion toward a lower portion of the curve according to a predetermined rule, the radii of curvature at the intersections of orthogonal curves crossing at right angles with the umbilical meridian curve in the refractive surface being substantially equal to the radii of curvature of the umbilical meridian curve at those intersections respectively so that the astigmatism along the umbilical meridian curve in the refractive surface is almost equal to zero, the umbilical meridian curve dividing the refractive surface into two lateral areas closer to the nasal side and temporal side respectively when the lens is mounted on the wearer, the two lateral areas of the refractive surface being asymmetrical with each other, the refractive surface being such that, when a second meridian curve extending in the vertical direction along the refractive surface to overlap, intersect or contact with the umbilical meridian curve in an upper region of the refractive surface is imagined, the umbilical meridian curve is displaced toward the nasal side relative to the second meridian curve in a lower region of the refractive surface, while it is less gradually displaced toward the nasal side relative to the second meridian curve in an intermediate region of the refractive surface, the intermediate and lower regions in which the umbilical meridian curve is displaced more or less toward the nasal side relative to the second meridian curve including at least one sectional curve which extends in the horizontal direction within a range of not more than 15 mm on opposite sides of the umbilical meridian curve and along which the distribution of astigmatism on the nasal side relative to the umbilical meridian curve is asymmetrical with that on the temporal side.

Other objects, features and advantages of the present invention will become apparent from the following detailed description of preferred embodiments thereof taken in conjunction with the accompanying drawings, in which:

For a better understanding of the present invention, a general method of designing a lens surface having progressively changing refractive power will be described with reference to FIG. 1, before describing the present invention in detail.

Figure 1:
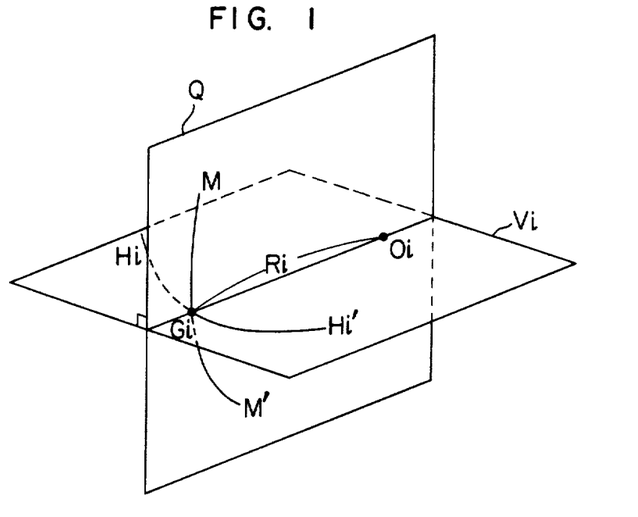
FIG. 1 is a diagrammatic view illustrating a general method of designing a lens surface having progressingly changing refractive power.

A plane Q called a principal vertical meridional plane hereinafter is first established in the space as shown in FIG. 1.

Then, on this principal vertical meridional plane Q, a helical curve M—M' called a meridian curve hereinafter is drawn which extends from an upper portion toward a lower portion of the plane Q and has its radius of curvature continuously decreased from its upper portion to its lower portion according to a predetermined rule. Subsequently, a plane Vi including points Gi and Oi and crossing in orthogonal relation with the principal vertical meridional plane Q is established as shown in FIG. 1, where Ri is the radius of curvature of the meridian curve M—M' at a selected point Gi, and Oi is the center of curvature. This plane Vi is called an orthogonal plane hereinafter.

Then, on this orthogonal plane Vi, a curve Hi—Hi' is drawn which passes through the point Gi, whose radius of curvature at the point Gi is equal to the radius of curvature Ri above described, and whose center of curvature coincides with the point Oi above described. This curve Hi—Hi' is called an orthogonal curve hereinafter. Such an orthogonal curve Hi—Hi' can be drawn for all of the points on the meridian curve M—M', and, therefore, the group of such orthogonal curves Hi—Hi' forms a curved surface. Thus, when such a curved plane is employed to provide a lens surface, any one of the points on the meridian curve M—M' provides an "umbilical point" at which the two major radii of curvature are equal to each other. Consequently, the meridian curve M—M' provides an "umbilical meridian curve" along which the astigmatism is almost equal to zero.

In the above description, only one orthogoanl curve Hi—Hi' has been defined for the point Gi.

It is apparent, however, that any one of the curves having the same radius of curvature Ri at this point Gi can be employed as the orthogonal curve Hi—Hi'. There are many examples having attempted to improve the progressive power ophthalmic lens utilizing the degree of freedom of the orthogonal curve Hi—Hi', and the present invention is also not an exception. These prior art examples include Japanese Patent Publication No. 3595/74, Japanese Patent Application Laid-open No. 46348/75 and Japanese Patent Publication No. 9626/72. According to the invention of Japanese Patent Publication No. 3595/74, the radius of curvature of the orthogonal curve Hi—Hi' is decreased from the center toward the lateral sides in the upper portion of the lens and is increased from the center toward the lateral sides in the lower portion of the lens, so that the overall astigmatism of the lens is consequently distributed or diluted over a wide range. According to the invention of Japanese Patent Application Laid-open No. 46348/75, the major directions of astigmatism in the side portions of the lens, that is, the directions of image distortion are arrayed in the vertical and horizontal directions of the side portions, thereby intending to alleviate or nullify the effect of astigmatism. However, there are very few examples of inventions concerning binocular lateral vision occupying a very large proportion of vision in the eneryday life, and, among the prior art examples cited above, Japanese Patent Publication No. 9626/72 deals, only insufficiently, with the subject of binocular lateral vision. The important feature of the last-mentioned patent publication resides in the fact that astigmatic errors on a lens surface are made symmetrical in the horizontal direction on opposite sides of a meridian plane including an inclined umbilical meridian curve.

The lens for the right eye and the lens for the left eye are generally in the form of mirror images of each other, that is, they are generally symmetrical with each other relative to the nose. In the prior art example disclosed in the last-mentioned patent publication, therefore, the angle of rotation of the eyeball of the right eye is regarded to be approximately equal to that of the eyeball of the left eye when the eyes of the wearer are turned in a lateral direction from the condition directed toward the front. In this case, the intersection of the right and left fixation lines, that is, the position of the visual target is represented by a point on a curve C shown in FIG. 2. This curve C is a portion of an arc in which the line connecting between the centers of rotation $O_L$ and $O_R$ of the eyeballs of the left and right eyes respectively provides the chord, and the angle of circumference of the chord is equal to the angle of vision $\alpha$. However, such a visual target arrangement is quite unnatural as a matter of course and does not in any way reflect the usual condition of vision. Further, the illustrated visual target arrangement is not fully sufficient or convincing in that the rotation of the head of the wearer for lateral vision described later is not utterly taken into account. Generally, it is usual that not only the eyeballs but also the head is rotated toward a visual target when we see a visual target disposed laterally relative to the front. In other words, the head is rotated to compensate for the rotation of the eyeballs.

Figure 3:
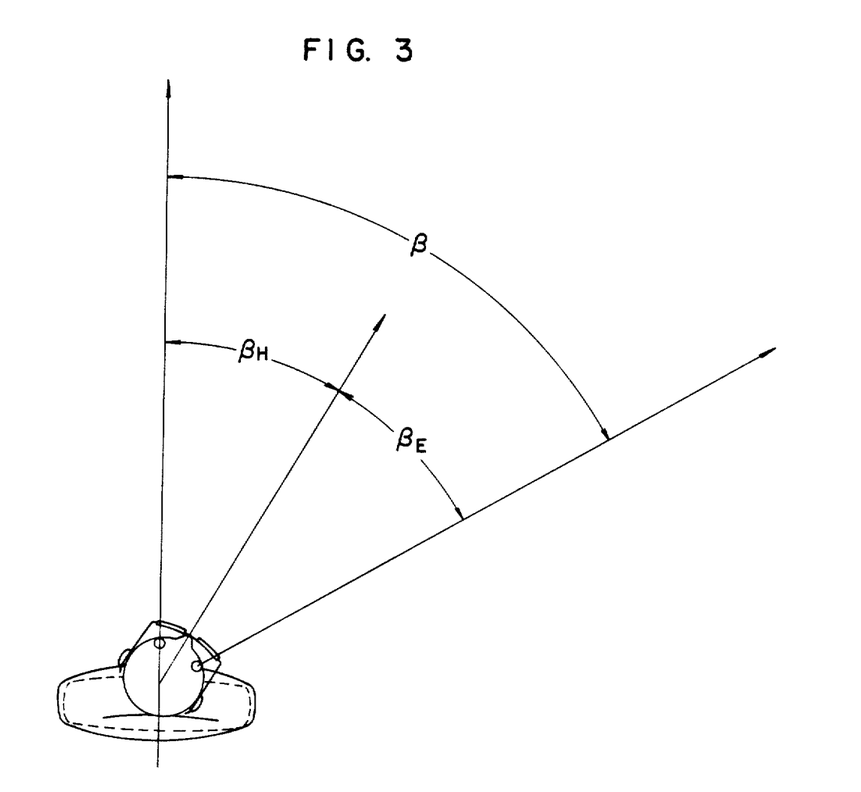
FIG. 3 is a diagrammatic view illustrating the relation between the direction of a visual target and the rotation of the head as well as the eyeball of the spectacle wearer, for explaining the principle of the present invention.

FIG. 3 illustrates that the wearer turns his eyes toward a visual target disposed laterally at an angle $\beta$ relative to the front from the condition seeing an object disposed directly in front of him. When the angle of rotation of the head is designated by $\beta_H$ and the angle of rotation of the eyeballs relative to the head is designated by $\beta_E$, the relation $\beta = \beta_H + \beta_E$ holds generally. If the visual target disposed in the direction of the angle $\beta$ is very interesting for the wearer, the relation $\beta_H > \beta_E$ would hold, and, in the contrary case, the relation $\beta_H < \beta_E$ would hold. However, it may be sufficient that the relation therebetween is generally given by $\beta_H \approx \beta_E$. Further, when the angle $\beta$ is very large as when, for example, the visual target is disposed in the rear of the wearer, the wearer will turn or twist his body or the wearer will change the direction of his legs to rotate the body itself toward the rear. In such a case, the body and limbs of the wearer cooperate bodily, as the word implies, to assist in the effort of the eyeballs trying to see the visual target. The same applies when the visual target is disposed in an upper or lower position besides the lateral position. By taking into account the above matter in the optical design of ophthalmic lenses, a quite novel function not having been proposed yet by the prior art ones can be developed so that comfortable ophthalmic lenses permitting viewing of an object in a condition analogous to viewing with the naked eyes can be provided. It is thus the object of the present invention to provide an ophthalmic lens which is based upon the standpoint entirely different from that of the prior art ones and which obviates all of the defects of the prior art ones.

More particularly, the present invention contemplates to provide an ophthalmic lens in which the unnatural arrangement of the visual target in the prior art ones is replaced by a more natural visual target arrangement, and the rotation of the head of the wearer for binocular lateral vision is taken into account, thereby permitting comfortable binocular lateral vision closer to vision with the naked eyes.

Figure 4:
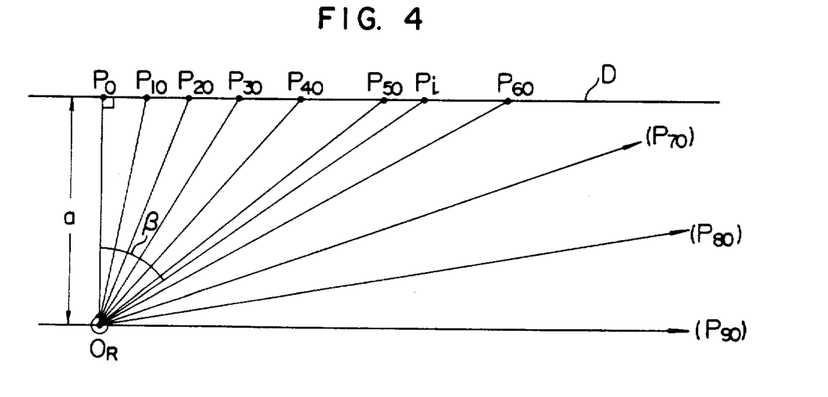
FIG. 4 is a diagrammatic view illustrating, by way of example, the position of a visual target for the wearer wearing the ophthalmic lens according to the present invention.

A practical aspect of the present invention will now be described in detail. As a first example, a straight line D as shown in FIG. 4 is selected to represent a most natural visual target arrangement in the horizontal direction. In FIG. 4, the symbol $O_R$ designates the center of rotation of the eyeball of the right eye, and the symbol Po designates the position of the visual target on the straight line D when the eyeball of the right eye is directed toward the front. Also, in FIG. 4, the line $\overline{O_R Po}$ connecting between $O_R$ and Po intersects at right angles with the straight line D. The line $\overline{O_R Po}$ has a length a, and the symbols $P_{10}$ to $P_{90}$ designate the successive positions of the visual target on the straight line D when the eyeball of the right eye is rotated successively through an angle of 10° at a time toward the right from the front looking position. In view of the limited illustration space, the symbols $P_{70}$, $P_{80}$ and $P_{90}$ are put in parentheses, and the directions of the positions $P_{70}$, $P_{80}$ and $P_{90}$ are merely shown by the arrows. Further, the position $P_{90}$ represents a point at infinity in the right direction.

Figure 5:
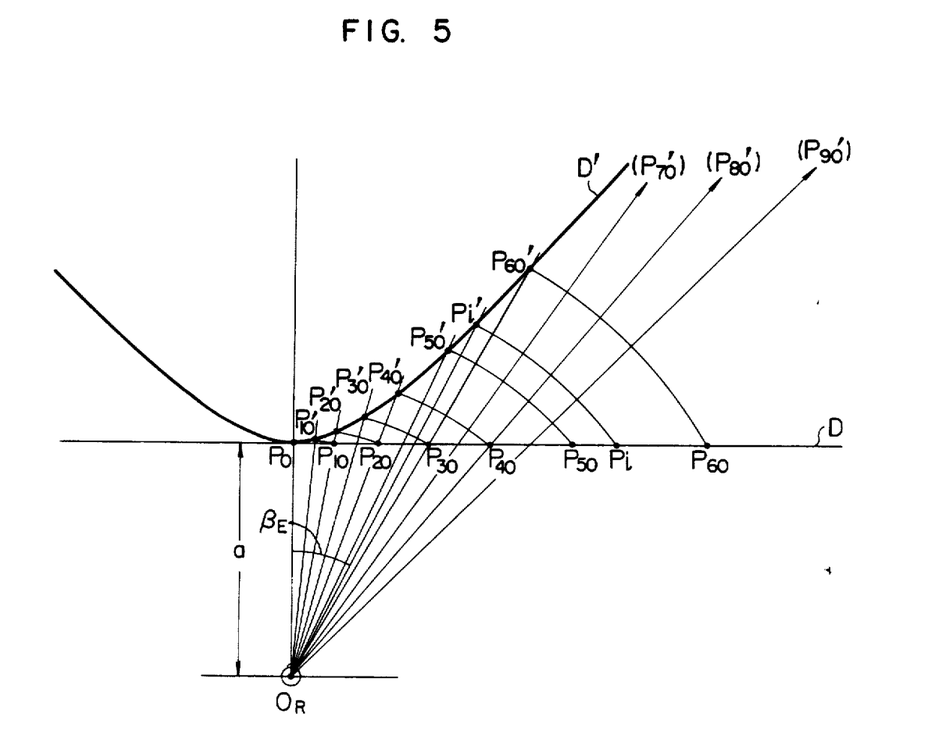
FIG. 5 is a diagrammatic view also illustrating, by way of example, the position of a visual target for the wearer wearing the ophthalmic lens according to the present invention.

Now, an arbitrary point Pi defining an angle $>PoO_R$ $Pi=\beta$ is selected on the straight line D. Then, the distance $\overline{O_R Pi}$ between $O_R$ and Pi is expressed as $\overline{O_R Pi} = a/\cos \beta$. As described hereinbefore, there is the relation $\beta = \beta_H + \beta_E$, where $\beta_H$ represents the angle of rotation of the head, and $\beta_E$ represents the angle of rotation of the eyeball of the right eye relative to the head, when the wearer sees the visual target disposed in the lateral position Pi angularly spaced apart by the angle $\beta$ from the position Po. Consider now the position on the ophthalmic lens through which the fixation line of the right eye passes. Then, the direction of the fixation line, that is, the direction of the visual target is represented by the angle $\beta_E$ and is not represented by the angle $\beta$ for the ophthalmic lens itself. This is because the ophthalmic lens and the head of the wearer are theoretically integral with each other, and the angle $\beta_H$ of unitary rotation of the ophthalmic lens and the wearer's head is entirely independent of the fixation line of the eyeball of the right eye relative to the ophthalmic lens. In other words, the direction of the visual target (represented by the angle $\beta$) for the lens wearer himself is different from the direction of the visual target (represented by the angle $\beta_E$) for the ophthalmic lens itself, and the difference therebetween is equal to the angle of rotation $\beta_H$ of the head of the wearer. This is the most important basis principle of the ophthalmic lens of the present invention which differs fundamentally from the prior art ones. Standing on the viewpoint above described, consider now the relative change between the position of the visual target for the spectacle wearer himself, which position is shown on the straight line D in FIG. 4, and the position of the visual target for the ophthalmic lens itself. Rotation of the wearer's head through the angle $\beta_H$ relative to the visual target means that the visual target rotates through an angle $-\beta_H$ relative to the wearer's head, according to the relative way of thinking. Suppose that all of the centers of rotation are located on the center of rotation $O_R$ of the eyeball of the right eye shown in FIG. 5 and there holds the relation $\beta_H \approx \beta_E$ between the angles $\beta_H$ and $\beta_E$. Then, the position Pi of the visual target for the lens wearer himself, which position is arbitrarily selected on the straight line D, shifts to a position Pi' for the ophthalmic lens itself. The latter position Pi' is determined by counter-clockwise rotation of the position Pi around the eyeball rotation center $O_R$ through an angle $\beta/2$, as shown in FIG. 5. It will be seen in FIG. 5 that the relation $\overline{O_R Pi} = \overline{O_R Pi'}$, holds, and the distance between the eyeball of the right eye and the visual target is unchanged. Thus, when a plurality of points $P_{10}'$ to $P_{90}'$ corresponding to the respective points $P_{10}$ to $P_{90}$ are similarly plotted, these points $P_{10}'$ to $P_{90}'$ form a curve D' as shown in FIG. 5. When the eyeball rotation center $O_R$ in FIG. 5 is taken as an origin, and the lines extending rightward and upward from this origin $O_R$ in FIG. 5 are taken as the x-axis and y-axis respectively, the x and y coordinates of the point Pi' on the curve D' are expressed as follows:

$$x = \frac{a}{\cos \beta} \cdot \sin \frac{\beta}{2}$$

$$y = \frac{a}{\cos \beta} \cdot \cos \frac{\beta}{2}$$

Therefore, the curve D' in FIG. 5 is expressed as follows:

$$y = \frac{\sqrt{2x^2 + a^2 + a\sqrt{8x^2 + a^2}}}{2}$$

Although the above description has referred only to the case of rightward monocular vision by the right eye for simplicity of explanation, it is apparent that the same applies to leftward monocular vision by the right eye and also to lateral vision by the left eye.

Further, although the center of rotation of the head is regarded to coincide with the center of rotation of the eyeball in the above description, it is needless to mention that the position of the former is not the same as that of the latter.

Figure 6:
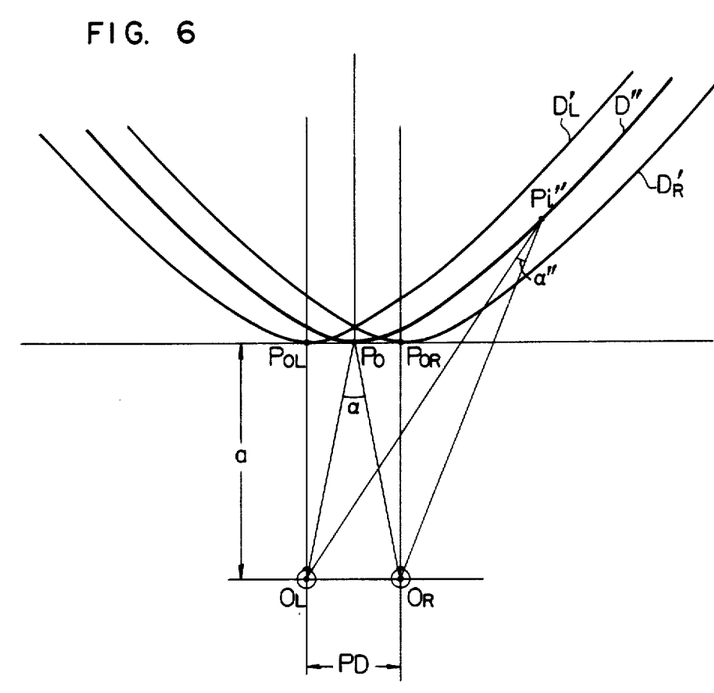
FIG. 6 is a diagrammatic view illustrating, by way of example, the case of binocular vision of the visual target shown in FIG. 5.

In the case of binocular vision, the presence of the distance $\overline{O_R O_L}$ between the eyeballs of the right and left eyes shown in FIG. 6 must be taken into account. It can therefore be readily surmised that the visual target for the pair of ophthalmic lenses will be represented by the combination of the curve $D_R'$ representing the visual targer for the right eye and the curve $D_L'$ representing the visual target for the left eye, as shown in FIG. 6.

In the consideration of binocular vision, one of the eyes may be dominant over the other, that is, the "dominant eye" may be present. In such a case, it can be easily surmised that the effect of the position of the visual target corresponding to the eyeball of the "dominant eye" will be greater than that of the position of the visual targer viewed with binocular vision. However, it may generally suffice to consider that a curve $D''$ lying intermediate between the visual target curves $D_L'$ and $D_R'$ for the left and right eyes respectively, as shown in FIG. 6, provides the position of the visual target in the case of binocular vision.

Figure 2:
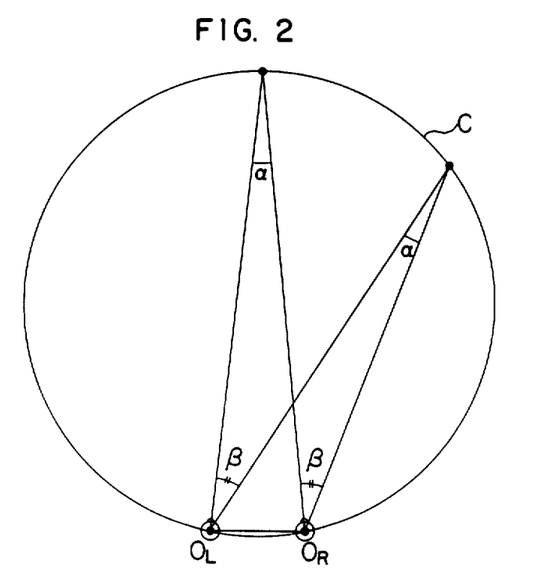
FIG. 2 is a diagrammatic view illustrating the position of a visual target in the prior art.

It is to be noted that this curve $D''$ differes greatly from the curve C in FIG. 2 showing the visual target position in the prior art ophthalmic lens.

In FIG. 6, a visual target $Pi''$ is shown displaced rightward from the front-viewing position Po on the curve $D''$. As this visual target $Pi''$ moves infinitely rightward from the position Po, the angle $\alpha''$ of binocular vision for viewing the visual target located at the position $Pi''$, that is, the angle $<O_L Pi'' O_R$ approaches progressively to zero. This progressive approach of the angle of binocular vision toward zero means that the relative convergence of the two eyes approaches progressively to zero. The angle of binocular vision attains finally the value of zero when $\beta = 90°$ or $\beta_E = 45°$ in the illustrated example. In summary, the relative convergence of the two eyes continues to progressively decrease as the lens wearer turns his eyes progressively in the lateral direction from the condition viewing a visual target located at a finite distance in front of him, and the relative convergence is finally reduced to zero when the eyeballs of the eyes of the lens wearer are directed to view a visual target located in the extreme lateral direction in which $\beta = 90°$, that is, when the ophthalmic lenses are directed to view a visual target located in the lateral direction in which $\beta_E$ is about 45°.

We will discuss the passing positions of the fixation lines on the ophthalmic lenses, that is, the positions on the ophthalmic lenses through which the wearer views a visual target disposed in the lateral direction.

Figure 7:
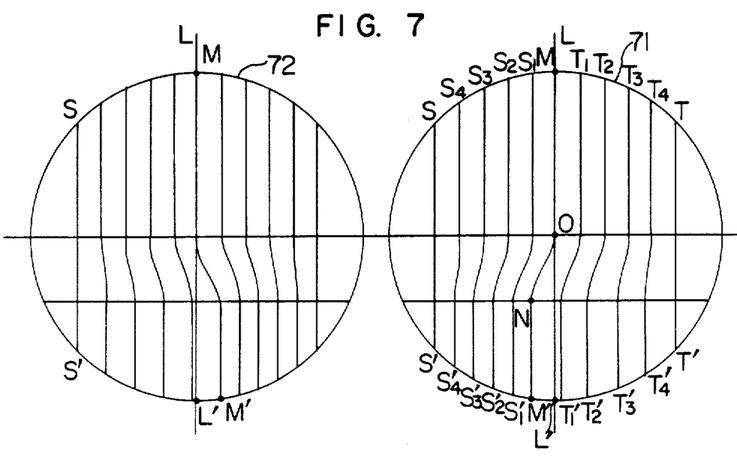
FIG. 7 is a schematic elevational view showing one form of the progressive power ophthalmic lens according to the present invention.

Referring to FIG. 7, reference numerals 71 and 72 designate left and right ophthalmic lenses respectively when viewed from the side of a first surface facing a visual target.

A thick solid curve M—M' is shown on each of the lenses 71 and 72. This curve M—M' is obtained by connecting the passing positions of the fixation line of the corresponding eye of the lens wearer for both of distant vision and near vision when he views a visual target disposed directly in front of him. Thus, this curve M—M' coincides normally with the aforementioned umbilical meridian curve.

A straight line L—L' is also shown on each of the lenses 71 and 72. This line L—L' extends vertically through the passing positions of the fixation line of the associated eye of the lens wearer for distant vision and is called the meridian curve.

A line S—S' is also shown on each of the lenses 71 and 72. This line S—S' is obtained by vertically connecting the passing positions of the fixation line of the associated eye of the lens wearer when the fixation line is diverted toward the right through an angle of 45°.

When the lens wearer views, through the ophthalmic lenses shown in FIG. 7, a visual target disposed at a finite distance in front of him, the two eyes converge more or less, and the fixation lines pass on the umbilical meridian curves M—M' instead of the meridian curves L—L'. Suppose that this visual target moves away progressively rightward in the horizontal direction. Then, the fixation lines move progressively rightward through an angle of 45° until finally they pass on the lines S—S' described above. In the course of the above manner of fixation line movement, the moving distance of the fixation line of the right eye on the associated ophthalmic lens is longer than that of the left eye. Conversely, the moving distance of the fixation line of the left eye is longer than that of the right eye when the visual target moves away progressively leftward in the horizontal direction. Thus, when both of these two cases are considered, it can be concluded that the moving distance of the fixation line of each of the eyes on the associated ophthalmic lens is longer on the temporal side than on the nasal side when the lens wearer viewing with the two eyes a visual target disposed at a finite distance in front of him diverts the eyes laterally in the horizontal direction for binocular lateral vision. It is preferable that the lens 71 for the left eye and the lens 72 for the right eye are in the form of mirror images of each other, that is, they are symmetrical with each other on opposite sides of the nose.

It is also preferable that the fixation lines of the two eyes for binocular vision pass on the ophthalmic lenses at such positions at which the factors of refraction (mean refractive power, amount of astigmatism, directions of major axes of astigmatism, etc.) with respect to one of the eyes are approximately equal to those with respect to the other.

Therefore, it is preferable that the distributions of the factors of refraction in the ophthalmic lenses 71 and 72 shown in FIG. 7 are mirror images of each other; that the factors of refraction in each of the lenses 71 and 72 are so distributed as to be symmetrical with each other relative to the meridian curve L—L' in the horizontal direction in the region where the umbilical meridian curve M—M' overlaps the meridian curve L—L'; and that the factors of refraction in each of the lenses 71 and 72 change more gradually in the horizontal direction on the temporal side than on the nasal side in the region where the umbilical meridian curve M—M' is displaced more or less toward the nasal side relative to the meridian curve L—L'. It is also preferable that the factors of refraction in each of the lenses 71 and 72 are symmetrical with each other relative to the meridian curve L—L' in the zones spaced apart by a "predetermined distance" of, for example, 15 mm from the meridian curve L—L' in the horizontal direction. This "predetermined distance" can be determined for each of individual points on the curve L—L'.

A preferred embodiment of the present invention will now be described. Referring to FIG. 7, the left-eye ophthalmic lens made according to the present invention is generally designated by the reference numeral 71, and the view is taken from the side of a visual target.

A point O is the geometrical center of the lens 71, and another point N shown on the lens surface is located beneath the center O at a position spaced apart by a vertical distance of 14 mm from the horizontal line passing through the center O and a horizontal distance of 2.5 mm toward the nasal side from the meridian curve L—L'.

In the illustrated lens 71, the area upper than the horizontal line passing through the point O serves as the region for distant vision, and the area lower than the horizontal line passing through the point N serves as the region for near vision. The remaining area, that is, the area lower than the horizontal line passing through the point O and upper than the horizontal line passing through the point N provides the region for intermediate vision. The line L—L' represents the aforementioned meridian curve passing through the point O, and the curve M—M' represents the aforementioned umbilical meridian curve passing through both of the point O and the point N. The distribution of refractive power on this umbilical meridian curve M—M' is such that the refractive power on the portion M-O has a constant value $D_F$, the refractive power on the portion N-M' has a constant value $D_N$, and the refractive power on the portion O-N increases progressively from $D_F$ to $D_N$. The straight lines S—S' and T—T' are located in a relation parallel and symmetrical with respect to the meridian curve L—L', and the horizontal distances from the meridian curve L—L' are equal to each other or 23 mm in the preferred embodiment of the present invention. The regions outer relative to the straight lines S—S' and T—T' provide planes symmetrical with each other relative to the meridian curve L—L' in the horizontal direction.

The shape of the surface of the lens 71 according to the present invention is defined by an envelope of a group of sectional curves when the lens is sectioned in the horizontal direction by planes passing through a plurality of arbitrarily selected points Gi on the umbilical meridian curve M—M'.

As described hereinbefore, the radius of curvature of each individual curve at the point Gi is so determined that the point Gi provides the umbilic. An arc will be the simplest form of the sectional curve. In fact, the initially employed form of the sectional curve was an arc in the embodiment of the present invention, and the shape of the sectional curve was modified by taking into account the distribution of the factors of refraction (means refractive power, amount of astigmatism, directions of major axes of astigmatism, etc.) described later. In this connection, the radius of curvature at the point Gi is preferably excepted from the modification so as to maintain the function of the point Gi as the umbilic. To find the two major radii of curvature and their axial directions at an arbitrarily selected point on an envelope of provisionally determined sectional curves in a manner as described above is well known as the Gauss' differential theory of surfaces.

The two major radii of curvature can be converted into the refractive power, whose unit is the diopter, by the following equation well known in this field of art:

$$D = (N-1)/R$$

where D is the refractive power whose unit is the diopter, R is the radius of curvature whose unit is the meter, and N is the index of refraction of the lens, having no unit. The arithmetic means of the two values of the refractive power thus calculated gives the mean refractive power, and the difference therebetween gives the amount of astigmatism. The axial directions of astigmatism coincide with the axial directions of the major radii of curvature above described. After the calculation of the distribution of the factors of refraction in the manner above described, the shape of the surface of the lens 71 is determined by modifying the factors of refraction in such a manner that the factors change less gradually from the umbilical meridian curve M—M' toward the temporal side in the horizontal direction than from the umbilical meridian curve M—M' toward the nasal side in the horizontal direction in the region where the umbilical meridan curve M—M' is displaced more or less toward the nasal side relative to the meridian curve L—L', as described already. While the lens 71 for the left eye has only been referred to in detail hereinbefore, it is apparent that the same applies also to the lens 72 for the right eye.

Thus, the both sides of spectacles 71 and 72 can be shaped to have the visual-target viewing surfaces which are mirror images of each other. That is, their lens surface configurations are the same in the region provided for distant vision and are symmetrical with each other in the regions provided for intermediate vision and near vision. The distribution of the factors of refraction at the surface of the lens 71 for the left eye shown in FIG. 7 is such that the values of refractive power on curves $T_1$—$T_1'$, $T_2$—$T_2'$, $T_3$—$T_3'$ and $T_4$—$T_4'$ depicted on the temporal side are approximately equal in the horizontal direction to those of corresponding curves $S_1$—$S_1'$, $S_2$—$S_2'$, $S_3$—$S_3'$ and $S_4$—$S_4'$ depicted on the nasal side, respectively. The same applies also to the lens 72 for the right eye. At a glance on FIG. 7, it will be readily seen that, in the region in which the umbilical meridian curve M—M' is more or less displaced toward the nasal side relative to meridian curve L—L' in each of the lenses 71 and 72, the factors of refraction change less gradually in the portion closer to the temporal side relative to the umbilical meridian curve M—M' than the portion closer to the nasal side relative to the umbilical meridian curve M—M'. The lens surface designed according to the present invention can be formed on a piece of suitable lens material by any one of suitable methods employed hitherto in this field of art.

By way of example, the lens surface according to the present invention may be divided into a matrix of 0.5 mm × 0.5 mm squares, and the data of cutting depths at the individual intersections may be stored in a memory provided for a numerically-controlled milling machine, the lens material being then cut with the milling machine so as to obtain a relatively rough lens surface. The relatively rough lens surface may then be ground with a sheet of soft grinding cloth, followed by successive steps of polishing with abrasives of gradually reduced grain sizes, until finally the desired completely polished lens surface can be obtained.

What is claimed is:

1. An ophthalmic lens having two refractive surfaces, one of said refractive surfaces including an imaginary first meridian curve (M—M') called an umbilical meridian curve extending substantially in the vertical direction along said refractive surface when said refractive surface is viewed from a direction substantially orthogonal with respect thereto in the condition in which said lens stands in the same vertical direction as that mounted on a wearer, the distribution of the radius of curvature of said umbilical meridian curve (M—M') including a zone in which the radius of curvature decreases gradually from an upper portion toward a lower portion of said curve according to a predetermined rule, the radii of curvature at the intersections of orthogonal curves crossing at right angles with said umbilical meridian curve (M—M') in said refractive surface being substantially equal to the radii of curvature of said umbilical meridian curve (M—M') at said intersections respectively so that the astigmatism along said umbilical meridian curve (M—M') in said refractive surface is almost equal to zero, said umbilical meridian curve (M—M') dividing said refractive surface into two lateral areas closer to the nasal side and temporal side respectively when said lens is mounted on the wearer, said two lateral areas of said refractive surface being asymmetrical with each other, said refractive surface being such that, when a second meridian curve (L—L') extendiang in the vertical direction along said refractive surface to overlap, intersect or contact with said umbilical meridian curve (M—M') in an upper region of said refractive surface is imagined, said umbilical meridian curve (M—M') is displaced toward the nasal side relative to said second meridian curve (L—L') in a lower region of said refractive surface, while it is less gradually displaced toward the nasal side relative to said second meridian curve (L—L') in an intermediate region of said refractive surface, said intermediate and lower regions in which said umbilical meridian curve (M—M') is displaced more or less toward the nasal side relative to said second meridian curve (L—L') including at least one sectional curve which extends in the horizontal direction within a range of not more than 15 mm on opposite sides of said umbilical meridian curve (M—M') and along which the distribution of astigmatism on the nasal side relative to said umbilical meridian curve (M—M') is asymmetrical with that on the temporal side.

2. An opthalmic lens having two refractive surfaces, one of said refractive surfaces including an imaginary first meridian curve (M—M') called an umbilical meridian curve extending substantially in the vertical direction along said refractive surface when said refractive surface is viewed from a direction substantially orthogonal with respect thereto in the condition in which said lens stands in the same vertical direction as that mounted on a wearer, the distribution of the radius of curvature of said umbilical meridian curve (M—M') including a zone in which the radius of curvature decrease gradually from an upper portion toward a lower portion of said curve according to a predetermined rule, the radii of curvature at the intersections of orthogonal curves crossing at right angles with said umbilical meridian curve (M—M') in said refractive surface being substantially equal to the radii of curvature of said umbilical meridian curve (M—M') at said intersections respectively so that the astigmatism along said umbilical meridian curve (M—M') in said refractive surface is almost equal to zero, said umbilical meridian curve (M—M') dividing said refractive surface into two lateral areas closer to the nasal side and temporal side respectively when said lens is mounted on the wearer, said two lateral areas of said refractive surface being asymmetrical with each other, said refractive surface being such that, when a second meridian curve (L—L') extending in the vertical direction along said refractive surface to overlap, intersect or contact with said umbilical meridian curve (M—M') in an upper region of said refractive surface is imagined, said umbilical meridian curve (M—M') is displaced toward the nasal side relative to said second meridian curve (L—L') in a lower region of said refractive surface, while it is less gradually displaced toward the nasal side relative to said second meridian curve (L—L') in an intermediate region of said refractive surface, said intermediate and lower regions in which said umbilical meridian curve (M—M') is displaced more or less toward the nasal side relative to said second meridian curve (L—L') including refractive surface portions which are symmetrical with each other relative to a plane including said second meridian curve (L—L') and which are included in two lateral areas spaced apart by not less than 17.5 mm from said second meridian curve (L—L') in the horizontal direction respectively.

3. An ophthalmic lens as claimed in claim 1 or 2, wherein the astigmatism along said umbilical meridian curve (M—M') is not less than zero but not more than 0.25 diopters.

* * * * *

UNITED STATES PATENT AND TRADEMARK OFFICE
CERTIFICATE OF CORRECTION

PATENT NO. : 4,729,651

DATED : March 8, 1988

INVENTOR(S) : Akira Kitani

It is certified that error appears in the above-identified patent and that said Letters Patent is hereby corrected as shown below:

Column 11, claim 1, line 11, delete "extendiang" and substitute herefor --extending--.

Signed and Sealed this

Fifth Day of July, 1988

Attest:

DONALD J. QUIGG

*Attesting Officer*  *Commissioner of Patents and Trademarks*